July 17, 1962 J. C. FROMMER 3,045,123
CALIBRATING SYSTEM FOR PARTICLE SENSING MACHINE
Filed Oct. 14, 1960 5 Sheets-Sheet 1

INVENTOR.
JOSEPH C. FROMMER
BY
*Schaeperklaus*

INVENTOR.
JOSEPH C. FROMMER
BY
Pearce and Schaeperklaus

July 17, 1962 J. C. FROMMER 3,045,123
CALIBRATING SYSTEM FOR PARTICLE SENSING MACHINE
Filed Oct. 14, 1960 5 Sheets-Sheet 3

INVENTOR.
JOSEPH C. FROMMER
BY
Pearce and Schaeperklaus

INVENTOR.
JOSEPH C. FROMMER

United States Patent Office 3,045,123
Patented July 17, 1962

3,045,123
CALIBRATING SYSTEM FOR PARTICLE
SENSING MACHINE
Joseph C. Frommer, 1525 Teakwood Ave.,
Cincinnati 24, Ohio
Filed Oct. 14, 1960, Ser. No. 62,605
17 Claims. (Cl. 250—218)

This invention relates to devices for the detection of minute particles in fluids, more particularly to their counting or the determination of their number per unit volume. The particles may be dust or bacteria in air, red or white cells in blood, or any other such particles as can be detected by their influence on the transfer of some signalling energy to a transducer. Such devices make use of a source of signalling energy, of a transducing system (under which term we understand a transducer which can be followed by a preamplifier to amplify the output of the transducer proper to a "transducing system output" of larger amplitude or power), of signal directing means which direct the signalling energy from said source in such a way that presence of a particle (or particles) in a certain location, to be called "inspection zone" alters the transfer of signalling energy from said source toward said transducing system, of means making the fluid to be tested enter the said inspection zone and of a computer sensitive to the output of said transducing system and which provides indication, recording, alarm, automatic correction or a combination of these or other functions depending on the output of said transducing system.

The source of signalling energy may be contained in the device as a lamp, a source of ultraviolet, infrared of other electromagnetic or corpuscular radiations, an ultrasonic oscillator, etc., but it may be also external to the device as sunshine, the magnetic field of the earth, etc. The transducer may be a phototube, a microphone, a Geiger counter, etc.

The signal directing means can be baffles, optical, electromagnetic, acoustical, nuclear lenses, reflectors, filters, shields, and so forth. The path of signalling energy from source to particle and from particle to transducer will be referred to as "main path of signalling energy." The computer following the transducing system may be electrical, hydraulic, pneumatic, etc., or a combination of these. The fluid to be tested is brought into the inspection zone. Such particles as may be present therein are detected by their influence on the transfer of signalling energy from source to transducer, and this influence will be referred to as "particle signal." This "particle signal" will alter the output of the transducing system by a corresponding amplitude to be called "particle output." The presence of particles usually increases the transfer of signalling energy to the transducer, but in certain configurations it may also decrease it.

The magnitude of the particle output can be expressed as a function (usually simple product) of the following three quantities:

(S) Sensitivity of the device, i.e., the particle output of a particle having physical properties chosen as standard, and exposing unit cross-sectional area to the main flow of signalling energy in the inspection zone.

(F) Cross-sectional area of the particle under consideration in the above direction.

(H) Signal transfer efficiency of the particle, i.e., the factor by which the particle under consideration transfers more or less signalling energy toward the transducer than particles chosen as standard and exposing equal cross-sectional area.

As a numerical example, let us assume that in a certain photoelectric particle counter, a white globule having .001 mm.² cross-sectional area introduced into the inspection zone causes a particle output of one milliampere. Smaller or larger white globules would then cause proportionally smaller or larger particle outputs. We can choose to designate the signal transfer efficiency of this white globule to be unity and we can define the sensitivity of this particular device as being $S=1$ milliampere/.001 mm.² or 1 amp./mm.². If we now introduce into the inspection zone of this device a globule having $F=.0005$ mm.² cross-sectional area and a reflection coefficient which reduces its signal transfer efficiency to $H=0.2$, then the particle output for this smaller and darker globule will be $S \times F \times H = 1$ amp./mm.²$\times 0.0005$ mm.²$\times 0.2 = .0001$ ampere or 0.1 milliampere.

The sensitivity of particle detecting devices is the resultant of a number of components. For example, in a photoelectric particle counter having a photomultiplier tube as transducer it depends on the type of lamp used, the voltage applied to the lamp, the darkening of its bulb, the wearing of its filament, the geometrical efficiency of the lens system between lamp and inspection zone and between inspection zone and photomultiplier, the size of aperture stops employed, filters inserted, darkening of the lenses by deposit of dust or chemical action, the sensitivity of the photocathode of the multiplier tube, the multiplication efficiency of its various dynodes for a given dynode voltage, the dynode voltage actually existing on these dynodes, gain of the preamplifier and so forth. We will refer to the entity of all these components as the "chain of sensitivities pertaining to the main path of signalling energy," and it should be noted that this chain contains also elements outside this path, e.g., dynode efficiency, or gain of preamplifier.

Among these factors there are some that vary as time goes by, usually in an undesired way, and there are others which are readily accessible to intentional adjustment either to compensate for the former changes or for other purposes as will be presented later. We will refer to the former as "time variable components" and to the latter as "intentionally variable components," and we will refer to the various structural elements contributing time variable component sensitivity as "intentionally variable structural elements." According to this definition, the filament, the glass envelope of the lamp, the lenses (as far as they are subject to aging), the cathode surface, the dynode surfaces of the multiplier tube are time variable structural elements, the elements influencing the voltage applied to the filament, to the multiplier dynodes, adjustable light stops, light filters that can be moved in and out of the light path between lamp and inspection zone or between inspection zone and photomultiplier are intentionally variable structural elements.

In certain applications it may be desired to neglect the presence of particles below a certain size and in practically all applications it is necessary to disregard such random variations in background transducer output as can be detected if we increase sensitivity of detection farther and farther. It is therefore necessary to keep the sensitivity of detection at such level as will recognize the presence of particles of desired size but will disregard smaller transducing system outputs. This, in turn, requires that the particle output for particles of given size and given signal transfer efficiency stay constant despite variations of the component sensitivity of various links of the chain of sensitivity pertaining to said main path of the signalling energy.

This can be achieved by establishing from time to time a calibrating signal, i.e., introducing a particle or another object of known size and signal transfer efficiency into the inspection zone or into an appropriate zone of another path of signalling energy, and adjusting at least one intentionally variable link of the chain of sensitivity of the main path of signalling energy until the transducing system output derived from this calibrating signal, the "calibrating output" reaches a given constant (or nearly constant) level. The path of signalling energy of this calibrating signal shall be called "auxiliary path of signalling energy" whether it contains elements different from the main path of signalling energy or not. However, for the purpose of this invention, it is necessary that the time variable structural elements the drifts of which are to be compensated, be common to the main path of signalling energy and to the auxiliary path of signalling energy. More broadly, it is necessary that the chain of sensitivity pertaining to the auxiliary path of signalling energy comprise all the time variable components of the chain of sensitivity pertaining to the main path of signalling energy the drift of which has to be compensated (which includes also the time variable circuit elements of the preamplifier following the transducer etc.).

Automatic gain control circuits, which will adjust the output of a system to an essentially constant level despite variations in component sensitivities of the system are known. According to the present invention, I provide such automatic gain control means, a calibrating means to turn a calibrating signal on and off, make the input of said automatic gain control means responsive to the calibrating outputs caused by said calibrating means but independent of particle outputs and connect the output of said automatic gain control means to an intentionally variable structural element the sensitivity of which forms part both of the chain of sensitivities of the main path of signalling energy and of the chain of sensitivities of the auxiliary path of signalling energy. This provides constant sensitivity during the calibrating periods. To extend the constant sensitivity beyond the calibrating periods to the periods of inspection I connect a capacitor to the input terminals of said automatic gain control system, and prevent the flow of current to it outside the calibrating periods.

When the particles to be detected are of very small size as dust, blood cells, bacteria, and so forth, the introduction of similar size standard particles into the inspection zone requires to have the inspection zone free from all other particles, to provide fluid with the standardizing particles suspended in it in the proper dilution, to switch the flow of fluid in the inspection zone from fluid to be tested to standard fluid. This requires considerable apparatus and increases the time duration of the control operation (during which no useful detecting or counting can be done) to undesirable length. In certain embodiments of the present invention I don't interfere with the flow of fluid to be detected in the inspection zone. Calibrating means can be provided of substantially larger dimensions than the particles to be detected, but the calibrating means are exposed to a path of signalling energy of substantially lower sensitivity. In one preferred embodiment, I simultaneously reduce the signal transfer sensitivity in the inspection zone so that the signal transfer of particles appearing therein will have a negligible effect during the calibrating period. In a photoelectric system this can be done by inserting, for the duration of the calibration, a light filter into the light path between lamp and insepciton zone and/or light path between inspection zone and phototube and introducing a visible body, e.g., a fine wire, into the inspection zone for a time duration just long enough to actuate the automatic gain control. For the rest of the time the light filter or filters and the calibrating wire are outside of the path of the signalling energy from source to transducer and do not interfere with detection of particles.

In other embodiments of this invention, I introduce into the path of light a baffle having a small opening or the like which permits passage of a standard amount of light suitable for use in calibrating during the calibration period, the baffle also preventing detection of particles.

It is an object of the invention to keep the sensitivity of particle detecting devices constant.

A further object of the invention is to achieve this by introducing calibrating signals into said devices and automatically set their gain to yield a given, essentially constant calibrating output as a result of these calibrating signals.

A further object of the invention is to counteract the adverse effect of calibrating signals on readings of the computers.

A further object of the invention is to provide warning or indication of malfunctioning of the device.

A further object of the invention is to insure that the time variable components of the sensitivity of the device affect its sensitivity toward calibrating stimuli in the same degree as they affect its sensitivity toward particles to be detected.

Other objects and advantages of the invention may become apparent in connection with the description of the drawings of which:

Figure 1:
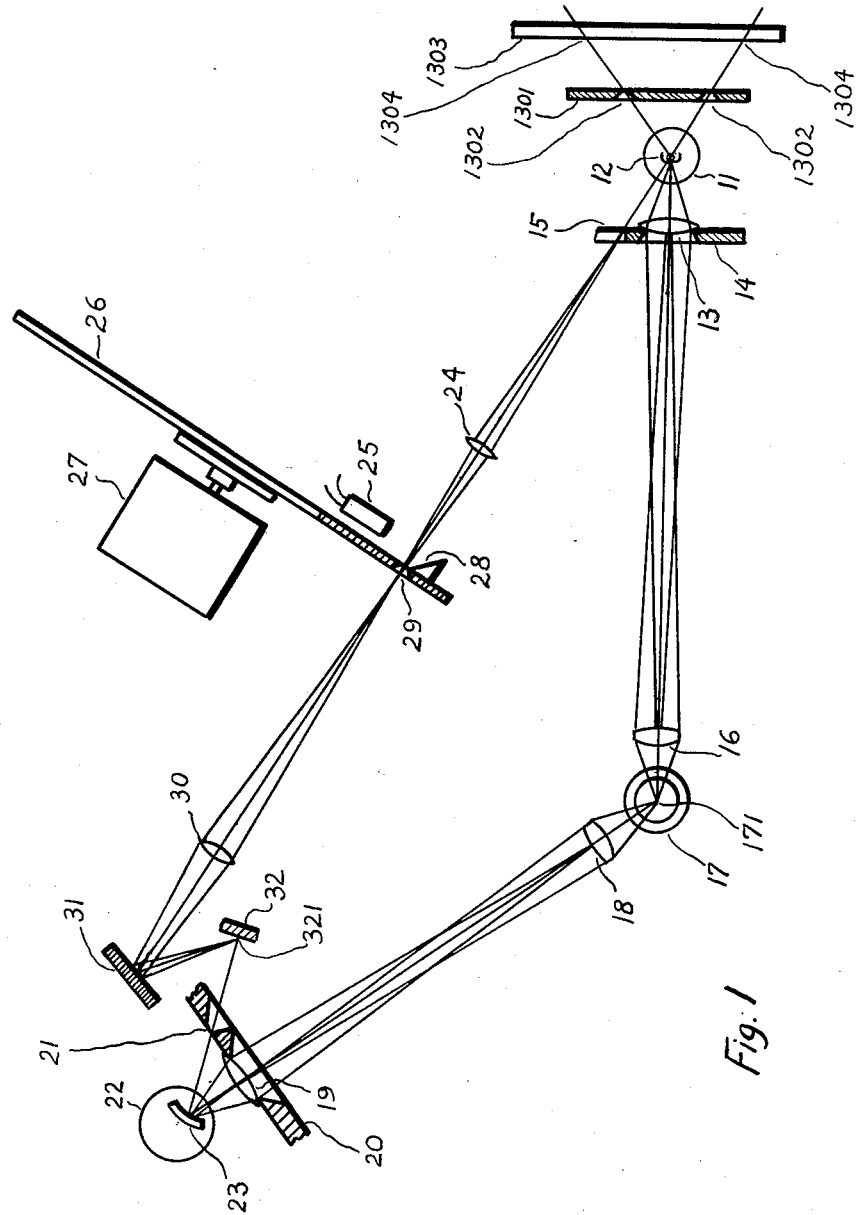
FIG. 1 represents schematically the pertinent parts of the physical layout of a dust particle counter constructed according to the invention.

In FIG. 1, 11 denotes a lamp having filaments 12, 13 a first condensing lens, 14 a mask limiting the free surface of lens 13, 15 is a slit in the plane of the drawing, 16 a first objective lens, 17 a pipe terminating below the plane of the drawing, 171 the location of the inspection zone, 18 a second objective lens, 19 a second condensing lens, 20 a mask limiting the free surface of lens 19 and having also a round hole 21, 22 is a photomultiplier tube, 23 its cathode, 24 a first auxiliary lens, 25 a photocell, 26 a disc, 27 a motor rotating said disc, 28 a mirror mounted on said disc, 29 a hole in said disc, 30 a second auxiliary lens, 31 a stationary mirror, 32 a piece of white tile, 321 the small area of its surface illuminated by mirror 31 which will transfer calibrating light. The air to be tested is blown through pipe 17 so part of it will pass the inspection zone 171 where it is illuminated by lamp 11 in the following way: Condensing lens 13 projects an image of filament 12 on first objective 16, which in turn projects an image of mask 14 into the plane of inspection zone 171. Phototube 23 inspects this air in the following way: second objective 18 projects a real image of a plane in the inspection zone 171 into the plane of mask 20; second condensing lens 19 projects a real image on second objective 18 of the cathode 23. In this way lenses 13, 16, 18, 19 create a main path of signalling energy (illumination) between lamp 11 and photomultiplier 22.

1301 is a baffle with two pinpoints 1302, 1303 is a piece of ground glass with markings at 1304. The pinpoints 1302 and markings 1304 are so positioned that the image of filament 12 will fall on both markings 1304 then and only then, when the filament is in its proper position. In this way when a new lamp is inserted, its position has to be altered until the image of its filament is again centered on markings 1304.

If the air contains a particle, then this particle will diffuse the light falling on it. Some of this light will reach the phototube and cause in it a "particle signal." Lamp 11 also illuminates slit 15 which may be .020" wide. First auxiliary lens 24 forms an image of this slit in the plane of disc 26. This disc normally cuts off the light falling on this image, but in the position shown in the figure, the light falling on hole 29 (which may have a diameter of .020″) can proceed toward second auxiliary lens 30, whence to mirror 31 and location 321 of white surface 32. Second auxiliary lens 30 forms an image of hole 29 in this location 321, and this image illuminates photocathode 23 through hole 21 which may have a $3/16$″ diameter. Therefore, once each revolution of disc 26 (say once every two seconds for 30 r.p.m. of the disc) when hole 29 passes the axis of this auxiliary optics ("auxiliary path of signalling energy"), the phototube gets an additional stimulus ("calibrating signal") through this auxiliary optics. At the same time as hole 29 gets in line with the image of slit 15, mirror 28 throws light from other parts of this image onto photocell 25, generating in it a signal which can be used to monitor the occurrence of the said stimulus. In this way, the device described will generate in phototube 22 particle signals for the duration of the presence of dust particles in the inspection zone and in addition, once every two seconds a calibrating signal from the auxiliary optics. Photocell 25 will provide a monitoring signal starting slightly before and ending slightly after said calibrating signal.

Figure 2:
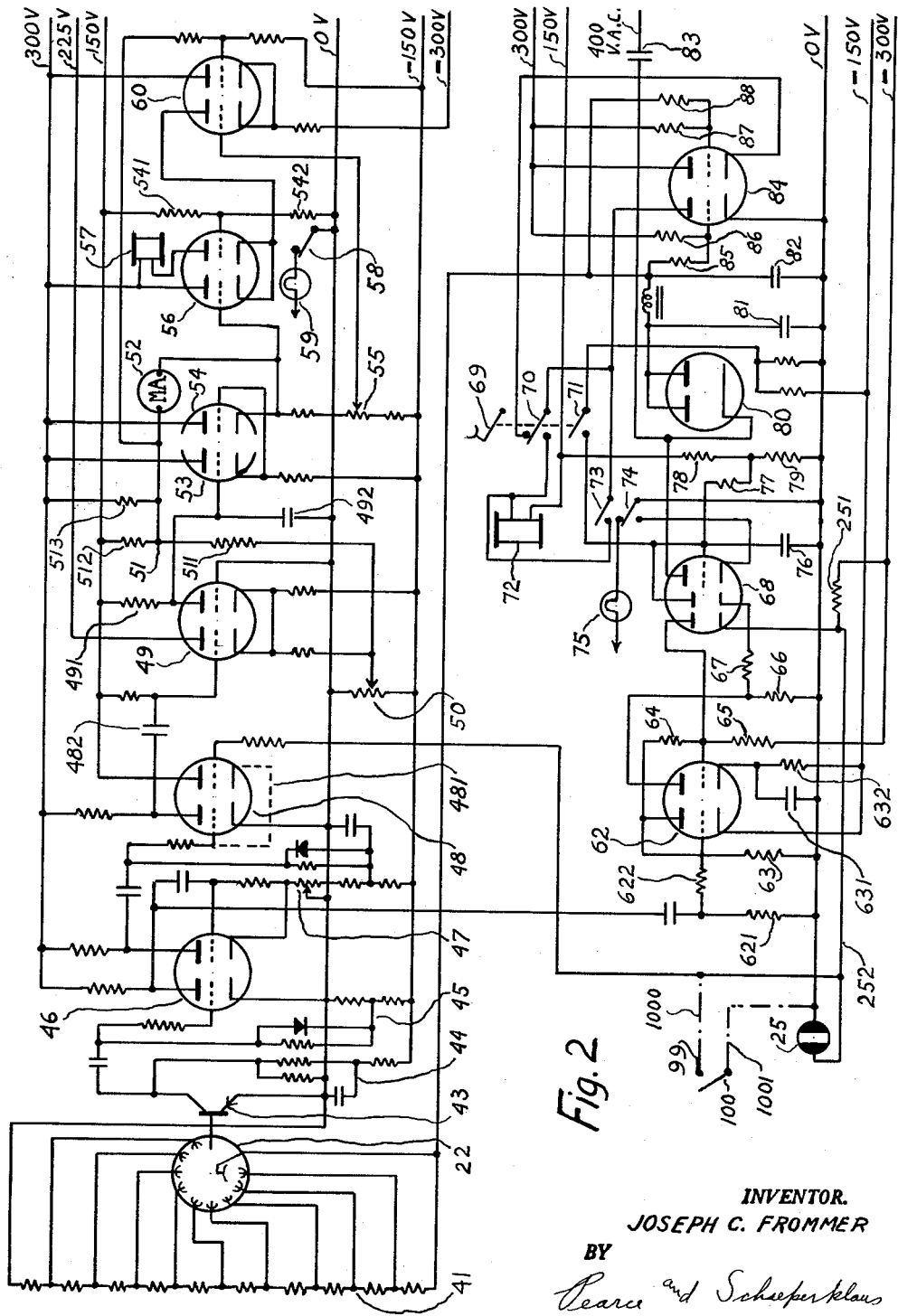
FIG. 2 is a circuit diagram of an amplifier constructed according to the invention which can be used in connection with the physical layout of FIG. 1.

FIG. 2 represents the schematic circuit diagram of a circuit which can be used in connection with the arrangement described in FIG. 1. In the following description of the circuit, specific examples of the elements are given for purposes of illustration, but these examples are only for purposes of illustration and the elements may be varied within the scope of the appended claims.

In this drawing 41 symbolizes a voltage divider comprising ten resistors 47K each; 22 a photomultiplier tube type 1P21, 43 a transistor type 2N63, 44 a filter network, voltage divider and collector load circuit, 45 a D.C. restoring circuit, 46 a twin triode type 12AX7, 47 an adjustable resistor of 25K, 48 a twin triode type 12AX7, 49 a twin triode type 12AU7, 50 a potentiometer of 25K, 51 the midpoint of a voltage divider comprising resistors 511, 512, 52 a milliammeter with 1 milliampere full scale sensitivity, 53 half of a low grid current twin triode type CK5755, 54 half of a type 12AT7 twin triode; 55 a potentiometer of 25K, 56 a twin triode type 12AZ7, 57 the coil of a relay, 58 a normally closed contact of this relay, 59 a signalling lamp, 60 a twin triode type 12AT7. 25 symbolizes the photocell also shown in FIG. 1, Clairex type CL3, which decreases its resistance if illuminated; 62 symbolizes a twin triode type 12AU7, 63 a 100K, 64 a 3.3 meg., 65 a 6.8 meg., 66 a 470K and 67 a 47K resistor; 68 is a twin diode plus triode type 6BJ8, 69 a pushbutton having a double throw contact 70 and a normally open contact 71; 72 is the coil of a relay having a normally open contact 73 and a double throw contact 74; 75 is a signalling lamp; 76 is a 10 microfarad capacitor, 77 and 78 are 22 meg., 79 is a 1 meg. resistor; 80 is a 6X4 rectifier tube, 81, 82, 83 are 2 mfd., 1500 volt capacitors, 84 is a 12AU7 twin triode, 85 is an 11.5, 86 a 2.2 meg., 87 a 3.3 meg. and 88 a 10 meg. resistor; 0 is the reference or "ground" line, 300 v., 225 v., −300 v. are the +300 volt, a +225 volt and a −300 volt line of a conventional power supply fed from a constant voltage transformer, 150 v. and −150 v. are +150 volt and −150 volt lines which can be regulated by standard voltage regulating tubes (not shown), 400 v. A.C. is a line at 400 volts R.M.S. A.C. with respect to the reference line 0, e.g., one terminal of the power transformer; 621 is a 2.2 meg., 622 is a 1 meg. resistor. 491 is a 12 meg. resistor, 492 is a 2.5 mfd. capacitor, 511 is an 82K, 512 a 20K and 513 a 220K resistor. 631 is a 20 mfd. capacitor. 632 is a 10K resistor. 541 is a 0.33 megohm, 542 a 22 megohm, 251 a 1.5 megohm resistor. 481 is a connection between the left grid and the right cathode of twin triode 48, drawn in dotted line and to be disregarded except for a modification to be described later. 482 is a capacitor of .005 mfd. 99 and 100 are mechanical contacts to be connected to ground line 0 and line 252 via dash-dotted lines 1000, 1001 in a modification to be described later in which photocell 25 is omitted, so that the dash-dotted lines 1000, 1001 should also be disregarded for the present.

The cathode and dynodes of photomultiplier 22 are fed from divider 41 which is connected to capacitor 82 (when talking about connection to a capacitor one of whose terminals is connected to the reference line 0, I understand connection to its other terminal) which stores the output of rectifier system 68, 80, to be described later. The anode of 22 is connected to the base of transistor 43. Collector of 43 is fed from network 44 and feeds D.C. restorer 45 which provides constant "dark level" for left grid of 46 (when talking about electrodes of twin or multiple tubes, I designate the electrodes drawn on the left or right side by "left" or "right" grid, cathode, etc.). 46 provides two stages of amplification. The output of 46 feeds the left side of 48 which is preceded by another D.C. restorer diode to further maintain constant dark level. The right cathode of 48 can be connected to its left grid by a connection 481 shown in dotted lines. This connection 481 and the right side of 48 is to be disregarded for the time being and serves only to illustrate an alternative to be discussed later. In that alternative circuit the grid of the right side grid is connected through a 2.2 meg. resistor to line 252.

The two cathodes of 49 are interconnected, its left grid is kept normally at +150 volts, its right grid is connected to ground. Its left anode is connected to +225 volts, its right anode to the high resistance, ½ minute time constant network 491, 492, and to grid of 53. 53 is connected as a cathode follower and its cathode feeds grid of 54 which is also connected as a cathode follower. Meter 52 is connected between the cathode of 54 and point 51 whose voltage is held slightly below 150 volts, by a value depending on the setting of potentiometer 50.

Relay coil 57 is connected to the right anode of 56, whose left grid is connected to 54's cathode and whose right grid is held by voltage divider 541, 542 slightly below +150 volts. The common cathode of 56 is connected to the left anode of 60 whose left grid is on the tap of potentiometer 55 providing an adjustable portion of the voltage on 54's cathode and whose right grid is on a voltage divider off point 51.

The left grid of 62 is connected to the left anode of 46 through a capacitor and a clipping network 621, 622. Its left cathode is on −150 volts, its left anode through resistor 63 on ground. The right grid of 62 is connected through the divider 64, 65 to its left anode, and through the left diode of 68 to line 252 on the junction of photocell 25 and its load resistor 251. The right cathode of 62 is connected through the filter network 631, 632 to −150 volts, the right anode of 62 goes through load resistor 66 to ground, through limiting resistor 67 and right diode of 68 to the high resistance, long time constant network 76, 77 on the grid of 68. Cathode of 68's triode goes to ground through relay contact 74 which is shown in its nonenergized ("normal") position, but which is actually energized during usual operation. Anode of 68's triode is connected to the cathode of rectifier 80 and through capacitor 83 to 400 volts A.C. The anodes of 80 are interconnected and go to filter condenser 81 and through a choke to condenser 82 which supplies dynode voltage for the photomultiplier. One end of relay coil 72 is connected to the left anode and to the right cathode of 84 (through its own contact 73 which is closed in normal operation), its other end is connected to the 150 v. line. Both grids of 84 are on voltage dividers between the dynode supply voltage on 82 and the +300 volt line.

This circuit (in connection with the layout of FIG. 1) works in the following way:

A particle of dust in the inspection zone or arrival of hole 29 once each revolution of disc 26 causes photocurrent in multiplier 22. This current is amplified in transistor 43 and causes a positive voltage pulse on its collector. This pulse is amplified in 46, 48 (3 stages) and causes an amplified negative pulse on left grid of 49. If this pulse exceeds 150 volts, the current of the common cathode is transferred from the left to the right plate of 49 and will charge up capacitor 492. The amplitude of this current is determined by the setting of potentiometer 50 and its duration by the duration of the presence of a particle inside the inspection zone (or the duration of illumination through hole 29). Resistor 491 discharges this capacitor toward the 150 volt line. In this way capacitor 492 assumes a direct voltage of 150 volts by an amount proportional to the duration of the presence of dust particles in the inspection zone of the instrument which is a measure of the number of particles per unit volume as disclosed in my Patent 2,775,159, plus the duration of the auxiliary pulses caused by the disc 26. This voltage (plus the grid to cathode voltage in followers 53, 54) appears on one side of meter 52. The other side of 52 is connected to point 51 which, by resistors 511, 512, 513 is kept at a voltage of 150 volts by a voltage to compensate for the calibrating signals and for the cathode follower drop. 511 is connected to tap of potentiometer 50 so that if this potentiometer is manually adjusted, compensation on point 51 should remain correct. Lamp 59 is to provide a warning signal both if the dust concentration transgresses a certain level and if some malfunctioning of the system causes it to be insensitive to the presence of dust particles. This is accomplished in the following way: In order for lamp 59 not to be ignited, it is necessary that relay coil 57 be energized. The first necessary condition for this is that the left grid of 56 be at a lower voltage than its right grid. The voltage divider 541, 542 is so chosen that as long as capacitor 492 gets at least the charge due to the calibrating signals from disc 26, the common cathode current of 56 will flow into relay coil 57, but if through breakdown in any portion of the system capacitor 492 does not get even this charge, the common cathode current is diverted toward the left anode of 56. But for this common cathode current to be present, it is also necessary that 60's common cathode current flow through its left anode into the common cathode of 56. This, in turn, will occur only if the voltage on the tap of potentiometer 55, hence the voltage of the cathode of 54, is higher than what corresponds to the allowable dust concentration. Coil 57 may preferably energize also other contacts to provide distant or audible signals or to actuate correcting mechanisms or to perform any such action as the case may call for.

The sensitivity of the system is maintained constant in the following way: Whenever a signal of sufficient amplitude appears in multiplier 22 and hence on left anode of 46, the left side of 62 stops conducting, its plate grows positive, and through resistor 64 tries to cause current conduction in its right side. But this is possible only when line 252 is not too negative, i.e., during illumination of photocell 25, since during the rest of the time the left diode of 68 prevents the right grid of 62 from getting conductive. Photocell 25 is illuminated only when mirror 28 (FIG. 1) illuminates it which coincides with the times when hole 29 sends a calibrating signal into phototube 22. If the calibrating signal is sufficiently strong, then the right anode of 62 conducts current into capacitor 76 and makes it more negative. Capacitor 76 is connected to the grid of 68's triode. This triode forms, together with 80, a voltage doubling rectifier, the output of which will be the lower the more negative bias 68's grid gets. Since the output of this rectifying system feeds photomultiplier 22, a state of equilibrium will be reached when the calibrating signals from the hole 29 are just strong enough to override the essentially positive bias provided by resistors 621, 622. In this way, despite variations in the light emission of the lamp 12, the sensitivity of multiplier cathode 23, of the secondary emission efficiency of its dynodes of transistor 43 and so on, the calibrating output caused by the light passed through hole 29 will remain constant and therefore the particle output due to particles of equal size and of equal light diffracting properties will also remain constant despite all these changes.

Instead of letting the calibrating signals reach tube 49 and compensating for their effect as described above, it is also possible to prevent their passage in the following way: The right side of tube 48 is made active by making the connection shown in dotted line at 481 between its right cathode and its left grid. As long as photocell 25 is in dark, line 252 will stay at a highly negative potential, will keep the right grid of 49 in cut-off and the device will function as described above. During the calibrating periods, however, when photocell 25 is illuminated and the potential of line 252 is therefore close to 0, the right side of 48 will be conductive and its cathode will prevent the left grid of 48 from assuming such negative potential as it would else due to the photocurrent caused by the light transmitted by hole 29 during this calibrating period. This gating will not interfere wtih the automatic gain control action of tube 62. If this alternate connection is used, then resistors 511 and 513 have to be replaced by a single dropping resistor between point 51 and ground, since we do not have to compensate any more for the effect of calibrating pulses only for the constant cathode to grid voltage drop of the cathode followers 53, 54.

It shall be noted (FIG. 1) that different parts of the filament 12 may alter their partial light emission and different parts of the photocathode 23 may alter their partial sensitivities in different degrees as time goes by. Therefore, if the auxiliary path of signalling energy provided by auxiliary lenses 24, 30 would admit light from any part of the filament and would send light to any part of the photocathode in some other proportion than does the main path of signalling energy formed by lenses 13, 16, 18, 19, then the automatic gain control would be afflicted by an error corresponding to the discrepancy in the drifts of these partial factors of these respective components of the total sensitivity. To avoid this, the filament 12 is so positioned, and the aperture stop of auxiliary lens 30 is held at such a diameter that surface 32 sees (via mirror 31) the same portion of filament 12, as sees a dust particle in the inspection zone 171. And, 321, the small illuminated area of white surface 32, sees through hole 21 essentially the same circular portion of photocathode 23 as is seen by a dust particle in the inspection zone 171 through lenses 18 and 19. Since the two optical systems look at the filament of the lamp from two different directions, this situation is maintained only as long as the filament stays in the position for which the adjustment was made. To insure proper positioning of the filament when the lamp is changed, the lamp positioning guide 1301—1304 insures that the lamp will be positioned properly all the time.

It may be expected that some times a particle of dust will appear simultaneously with passage of hole 29 and will add to hole 29's signal. To avoid undue reduction of the sensitivity due to such coincidence, the signal of 29 is made large compared to the signal to be expected from usual particles of dust, and the charge that can be conducted to 76 during each passage of hole 29 is limited to cause only slight increase on the bias. Even this slight error may be corrected by discharging capacitor 76 not toward a constant voltage but toward a voltage increased by a value depending on the average output of photomultiplier 22 to compensate for the probable increase in the average of the signals due to passage of hole 29.

Relay coil 72 is to provide warning signals (e.g. through energizing lamp 75) if the voltage on 82 is too high or too low (as a result of malfunctioning of some parts), and also to kill the high voltage as this voltage gets too high or too low, and to make it necessary to restart the high voltage with a separate pushbutton 69 each time this has occurred and after each turning on of the device. This prevents unintentional high voltage on the photomultiplier during servicing when it may get too high illumination, etc.

When the unit is first turned on, or after each de-energization of relay coil 72, contact 73 interrupts current to it. If pushbutton 69 is pushed down, contact 70 bypasses contact 73 and coil 72 can keep itself energized through its own contact 73 after release of pushbutton 69. But if the voltage on 82 becomes too negative, the left grid of 84 cuts off this current and coil 72 drops out. And if the negative voltage on 82 is too low, then the right half of 84 preempts the current of 84's left anode and 72 drops out again. Contact 71 of pushbutton 69 provides instantaneously the proper bias to 68 so that whatever the charge on 76 was originally, it should be right for the duration of resetting by pushbutton 69.

Figure 3:
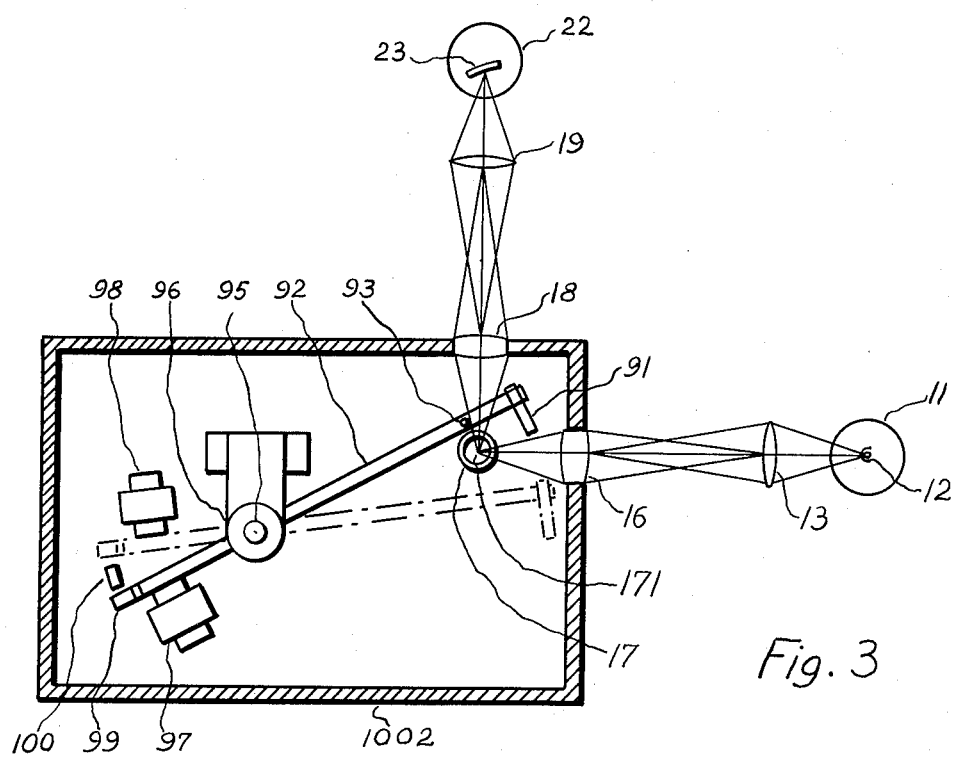
FIGS. 3 and 4 are schematic plan and elevation views of the pertinent parts of an alternative physical layout which can equally be used in connection with the circuit diagram of FIG. 2.
Figure 4:
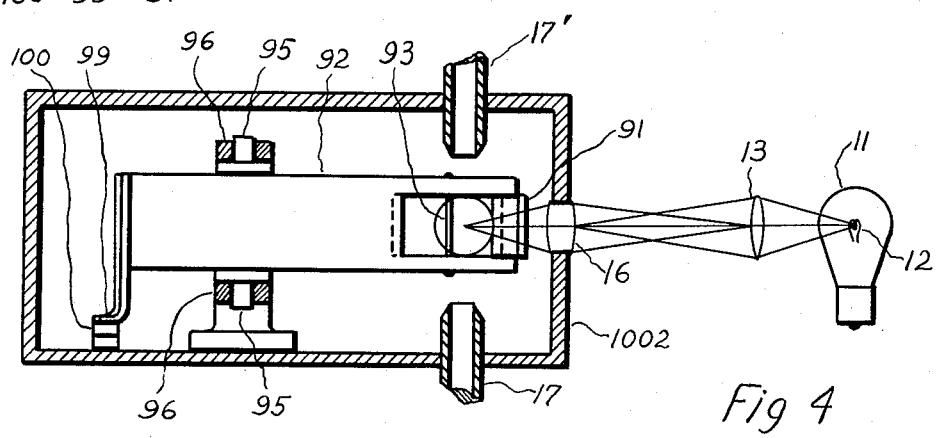

FIGS. 3 and 4 represent plan and elevation of an improved and simplified physical layout which may be used in connection with the circuit of FIG. 2 or with some other similar circuit. In these figures lamp photomultiplier, the principal lenses, the air pipe and inspection zone are designated with the same numerals as in FIG. 1. 91 is a dark filter which transmits, say, 1/100 of the light falling on it, 93 a piece of thin platinum wire. Both are mounted on a steel fork 92. Fork 92 is pivoted on its stub shafts 95 in bearings 96. 97 and 98 are electromagnets, and 99 is an electrical wiper contact facing the conducting surface 100. The photomultiplier 22 is connected as shown in FIG. 2. In this embodiment photocell 25 (FIG. 2) is omitted and leads 1000, 1001 (shown in dot-dash lines) connect wiper 99 and conductor 100 in place thereof. Point 251 is kept at high negative potential in the normal positions of fork 92 as shown in the drawing but at ground potential when 99 and 100 make contact during motion of fork 92 when it pivots from one of its normal positions to its other normal position. A rectangular box 1002 symbolizes the enclosure which keeps outside light away. 17′ is an orifice through which the inspected air can escape.

A mechanical, electrical or electronic timing device (not shown) switches current alternatingly to coils 97 and 98 in such a way that for two seconds one is energized, for the next two seconds the other, and so forth. Each time current is switched, fork 92 swings from its position shown in full lines (for current in coil 97) to its position shown in dotted lines (for current in coil 98) or vice versa. During this movement filter 91 darkens the inspection zone, wiper 99 makes contact with surface 100 and wire 93 traverses the inspection zone 171. During the rest of the time, in both stationary positions of fork 92, filter 91 is out of the light path, wire 93 is outside the inspection zone, wiper 99 is isolated from surface 100 and counting of dust particles takes place as in the system of FIG. 1.

When the wire 93 appears in the inspection zone 171, it imparts a calibrating signal. Since the surface area of this wire is far bigger than that of dust particles, these calibrating signals would be far too large if the light filter 91 would not substantially reduce its illumination. The presence of this filter will also insure that dust particles appearing simultaneously with this calibrating signal will have a negligible effect. These dust particles will be lost for the count, but this loss can be included into the calibration of the device. The effect of the calibrating signals on the count can also be taken into the calibration or withheld from that part of the circuit as was described in connection with FIG. 2.

FIGS. 5, 6, 7 and 8 relate to an application of the invention to a photoelectric blood cell counter, which counts red or white blood cells according to the aforementioned U.S. Patent No. 2,775,159.

Figure 5:
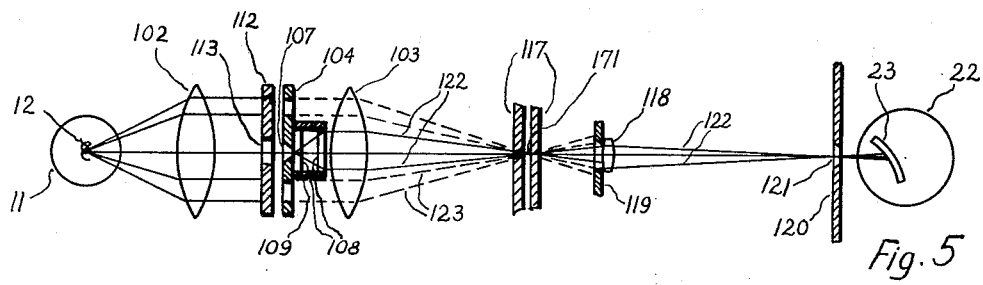
FIGS. 5, 6, 7 and 8 are schematic plan, elevation, side view and a circuit diagram of a blood particle counter constructed according to the invention.
Figure 6:
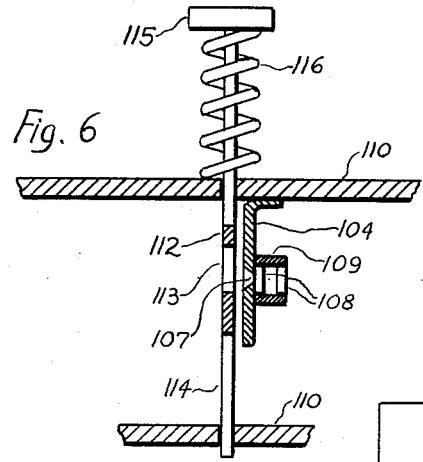
Figure 7:
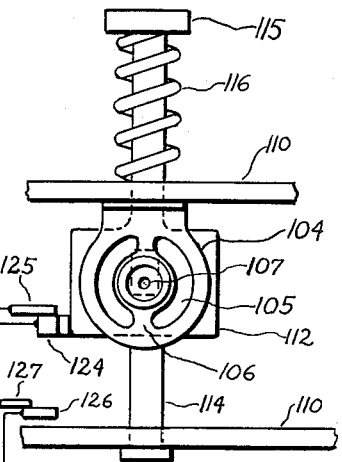
Figure 8:
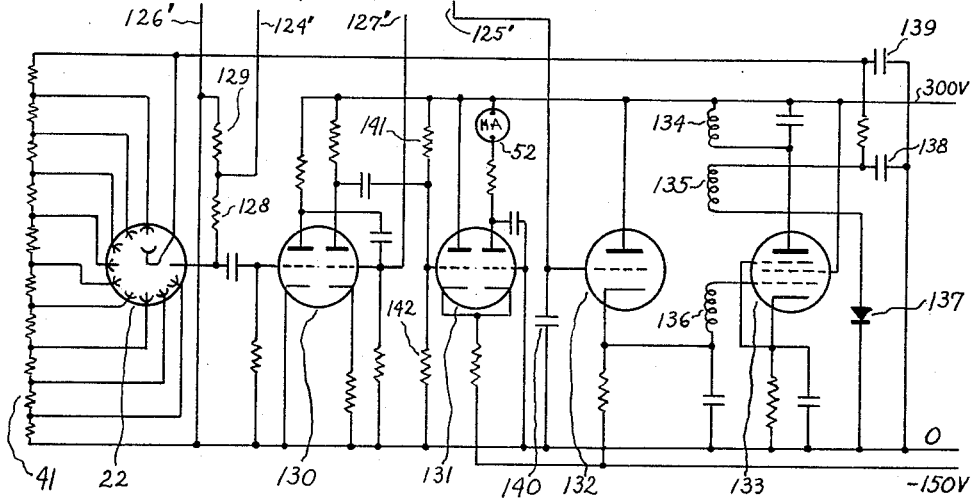

FIG. 5 is a schematic cross-sectional plan view of the optical system, FIG. 6 is a front elevation of its portion pertaining to the present invention, FIG. 7 represents the side view of FIG. 6, and FIG. 8 is an electrical circuit diagram according to the invention which can be used in connection with the structure of FIGS. 5, 6, and 7.

As in the other drawings, 11 denotes a lamp having a filament 12, 22 a photomultiplier tube having a cathode 23. 102 and 103 are biconvex lenses. 104 is a dark field stop, i.e., an opaque plate with an annular opening 105 interrupted by vertical spokes 106 which hold its internal portion. In its application to the present invention, this dark field stop has also a small hole 107 in its center and in front of this hole two ground glass discs 108 held by cylinder 109. The dark field stop 104 is fastened to the upper plate of the framework 110. 112 is a baffle with a hole 113 in its center, a guiding stem 114 and a pushbutton 115. 116 is a compression spring. 117 indicates two transparent walls between which a solution of the blood to be tested is permitted to flow. 118 is an achromatic lens limited by aperture stop 119. 120 is an opaque mask with hole 121 in its center. 122 symbolizes light rays passing the optical system with the baffle 112 in its upper position, as shown, 123 symbolizes light rays passing the system if pushbutton 115 is pushed down. With the pushbutton pushed down, the optical system is a conventional dark field illuminator: lenses 102, 103 concentrate the light of filament 12 into the inspection zone 171. This inspection zone is limited by the transparent walls 117 and such image of hole 121 as lens 118 would form there if illumination came from the right. Dark field stop 104 intercepts all rays as would proceed in a straight line toward the free opening of lens 118. A blood cell appearing inside the inspection zone will diffract rays reaching it and cause some of these rays to enter lens 118 and hence photocathode 23. In this way photomultiplier 22 will provide a "particle signal" for the duration of the presence of a particle (blood cell) inside the inspection zone, the magnitude of this particle signal being dependent on the light emission of the lamp, the sensitivity of the photomultiplier, the size of the blood cell and so forth. In the upper position of pushbutton 115 a continuous calibrating signal is provided in the following way: light of the filament 12 reaching hole 107 through hole 113 is thrown by the first piece of ground glass 108 in all directions and covers the entire surface of the second piece of ground glass 108. This second piece will throw the light reaching it again in all directions so that some of it will proceed toward the inspection zone 171 and hence through lens 118 to photocathode 23, as shown by rays 122. The two ground glass discs substantially reduce the light proceeding toward the inspection zone 171, so that hole 107 can be much larger than a blood cell, and they distribute it over the entire surface of lens 118, so that it will reach all points of cathode 23 which are reached by light diffracted by blood cells.

FIG. 7 represents a side elevation of the essential parts of FIG. 6, plus electrical contactors to be connected to respective points of the circuit diagram of FIG. 8. In this drawing 124 denotes a contactor making contact to contactor 125 in the upper position of pushbutton 115 and making contact to contactor 126 in the lower position of pushbutton 115; contactor 127 normally makes contact with 126 but is separated from it when pushbutton 115 is pushed down. In FIG. 8, 22 is the photomultiplier tube fed by voltage divider 41. 128 is a 150K, 129 is a 10 megohm resistor. 130, 131 are twin triodes, 52 is a meter indicating the number of blood cells per cubic millimeter, 132 is a triode, 133 is a pentode, 134, 135 and 136 are the primary, high voltage secondary and tickler coil of a high frequency transformer, 137 symbolizes a 1000 volt rectifier, 138 and 139 are high voltage filter capacitors and 140 is a low leakage capacitor. 141 is a 2.2 meg., 142 is a 470K resistor. Leads 124′, 125′, 126′ and 127′ connect to contactors 124, 125, 126 and 127, respectively, of FIG. 7.

To operate this device, pushbutton 115 has to be pushed down. In this position the common point of resistors 128 and 129 makes contact to ground (through contactors 124, 126) so that the 10 meghom resistor 129 is shorted out and the photomultiplier's plate load is the 150K resistor 128. Such relatively low plate resistance is necessary for good frequency response of the counter. The signals appearing there are amplified in twin triode 130 (the short circuit on its right grid through contactors 126, 127 is now opened) so that each time a blood particle appears in inspection zone 171, a negative signal of, say, 100 volts, appears on the left grid of twin triode 131. This grid is normally held at about 53 volts above ground, so that a −100 volts signal will make it about −47 volts. The right grid of 131 is kept on ground potential. Therefore, as long as no blood particle is in the inspection zone 171, all the cathode current of 131 flows into its left anode, but during the presence of a blood particle there, all its cathode current flows into its right anode. The average value of this current is a direct indication of the number of blood cells per cubic millimeter and is indicated on meter 52.

The voltage divider 41 feeding photomultiplier 23 is energized from capacitor 139 which carries the filtered and rectified output of the high frequency coil 135. The voltage of this output is controlled by the bias impressed on tickler coil 136 by the cathode of tube 132. The voltage on this cathode in turn, depends on the voltage present on capacitor 140 which, in the lower position of pushbutton 115 is the only circuit element connected to this grid. The voltage on this capacitor can be kept constant for the duration of each test as shall be exemplified by the following numerical data: Capacitor 140 may be 0.1 mfd. with 100,000 megohm insulation resistance leaking $10^{-9}$ amperes at 100 volts. Tube 132 may be one-half of a CK–5755 twin triode having less than $2 \times 10^{-9}$ ampere grid current. The combined leakage currents will therefore stay below $3 \times 10^{-9}$ A., which would charge a 0.1 mfd. capacitor by $3 \times 10^{-9}/0.1 \times 10^{-6} = 0.03$ volt/sec. A test may last 20 seconds, so that the maximum possible drift during one test would be $20 \times 0.03 = 0.6$ volt.

It shall now be shown how, during the upper position of pushbutton 115, capacitor 140 is brought to such a voltage as will insure a constant photomultiplier output for blood cells of given size, despite variations of light emission of the lamp, sensitivity of photocathode, etc. When pushbutton 115 is released, contactors 126 and 127 contact again so that the right grid of tube 130 is shorted to ground and no signal can reach tube 131 and hence meter 52 will drop back into its zero position. Next, contactor 124 separates from grounded contactor 126 so that the load resistance on the photomultiplier increases from 150K to 10.15 megohms. When pushbutton 115 reaches its top position, capacitor 140 (and the grid of tube 132) are connected to 10 megs. of the photomultiplier's load resistance (through contactors 124, 125), so that this grid will be the more negative the larger the photomultiplier's plate current is. In this upper position of pushbutton 115, the photomultiplier's cathode will be exposed continuously to the calibrating rays 122. The direct current leaving its plate will depend on the light flux transmitted through calibrating hole 107 and on the voltage applied to the voltage divider 41. This voltage, in turn, will be the larger, the less negative the bias applied to coil 136 is, therefore the larger the less negative the voltage on load resistor 129 and hence on grid of tube 132 is. This feedback loop will stabilize the dynode voltages at a level which will cause a substantially constant sensitivity of the system for the light transmitted by calibrating hole 107, despite the variations of the lamp emission, and other time variable links of the total sensitivity. But if the voltage on capacitor 140 is held at a voltage which keeps the direct current response to the light transmitted by calibrating hole 107 constant, then the pulse height obtained through passage of cells of given size will also be held constant as long as the voltage on capacitor 140 stays constant and no other drift in sensitivities occurs. Since the drift of sensitivity is usually very slow and since the capacitor 140 maintains the voltage applied to it in the upper position of pushbutton 115 for the full duration of each count, the instrument will automatically calibrate itself all the time during which it is powered but not used.

This simple embodiment of the invention can be refined in various ways. The residual variations of the sensitivity due to the need for variation in bias on coil 136 to achieve substantially different oscillator outputs for substantial variations of the time variable components of sensitivity can be reduced or entirely removed by methods well known in servomechanism theory. The 10 megohm value for resistor 129 chosen for a type 1P21 multiplier can be reduced for less expensive multipliers having higher dark current. The high frequency oscillator system 133 through 139 may be replaced by a 60 cycle rectifier system. The pushbutton 115 may be mechanically interlocked with the on-off switch or the on-standby-off switch of the instrument and a dashpot or other time-delay device in such a way that pushbutton 115 can not be pushed down before sufficient time has elapsed for all parts of the device to assume their stable operational state. The simple programming system consisting of: calibrate during upper position of pushrod, count during low position of pushrod can be refined to other sequential programming, e.g.: standby during upper position, calibrate during downstroke, work in lower position, check calibration during upstroke, provide warning signal if calibration at upstroke is out of limits. Optical design similar to that described in connection with FIG. 1 may insure that illumination of hole 107 is derived exactly from the same portions of filament 12 and exactly in the same proportions as illumination of inspection zone 171. The frosting, darkness, curvature or thickness of the second ground glass disc 108 can be so designed that the illumination from its various radial regions follow the same uniform pattern as does the distribution of rays diffracted by blood cells over the surface of lens 118. Other improvements or modifications may also occur to those versed in the art without departing from the spirit of the present invention.

Figure 9:
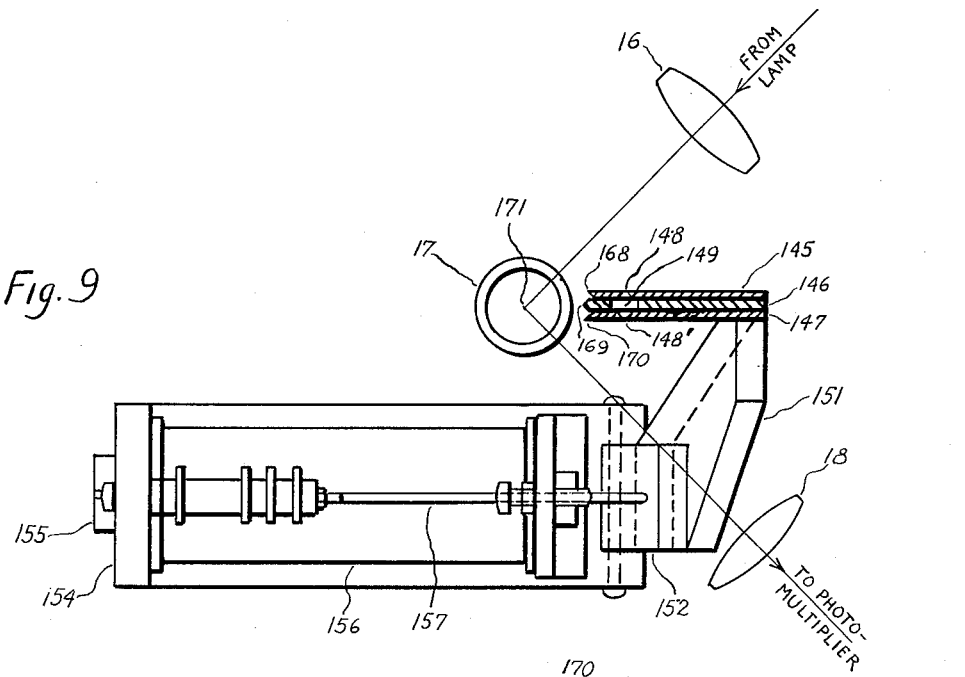
FIGS. 9 and 10 are schematic plan and elevation views of the calibrating system of a dust particle counter which can be used in connection with the circuit diagram of FIG. 8.
Figure 10:
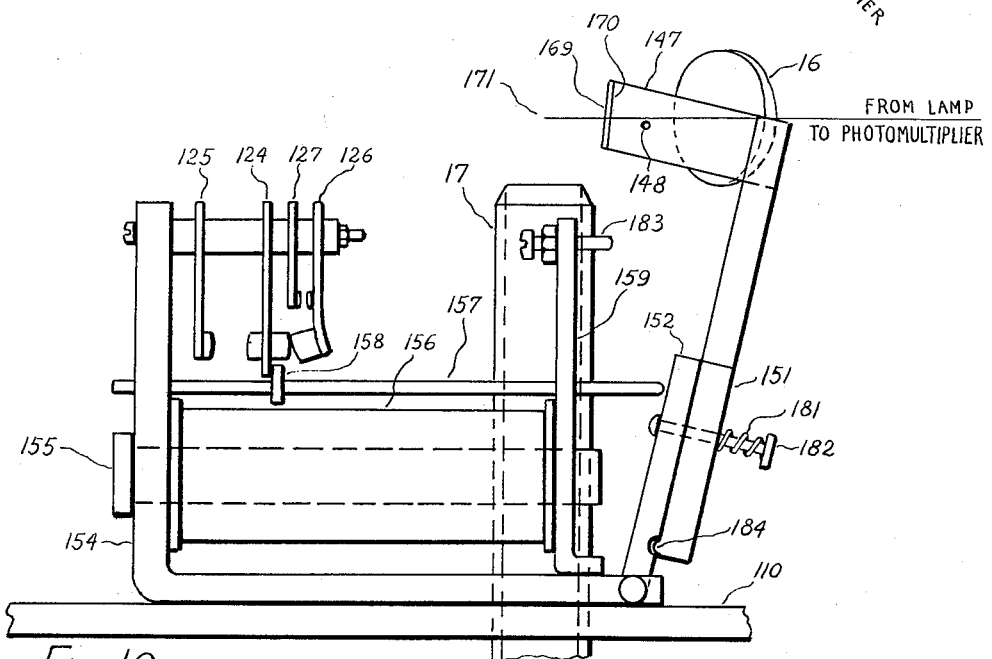

The circuit of FIG. 8 can be used also in connection with a dust particle counter, e.g., by providing to the dust particle counter the calibrating means shown schematically in FIGS. 9 and 10. In these figures, as in the earlier ones, 171 denotes the location of the inspection zone illuminated by first objective 16 and from which second objective 18 gathers light to the photomultiplier (not shown), and 17 is the hole through which the air to be tested enters the instrument. Contactors 124 through 127 are connected as in FIG. 7, but it should be noted that whilst in FIG. 7 they are shown in their "calibrate" position, they are shown in their "detect dust" position in FIG. 10, since this embodiment of the invention serves to allow continuous dust detection with calibration occurring periodically for short time durations only. 145, 146, 147 are three layers of a light baffle with one each hole 148, 149, 148' in each of them having sharp edges 168, 169, 170, and fastened to a rhombus-shaped support 151. 151 is of nonmagnetic material and held to the soft iron plate (armature) 152 by spring 181 and spring shaft 182. 152 is pivoted in yoke 154 which holds iron rod 155 inside the solenoid coil 156. 157 is a pushrod having a disc 158 fastened to it and guided in yoke 154 and in bracket 159. Yoke 154 is fastened to the framework 110 of the instrument. If current is admitted to coil 156, it attracts armature 152 which carries support 151 along until it hits limiting screw 183. From then on 151 will pivot in groove 184. 183 is so adjusted that holes 148, 148' stop in the optical axes of lenses 16 and 18, respectively.

The baffle 145, 146, 147 is positioned between lenses 16 and 18 in such a way that when it enters the inspection zone and edge 168 becomes illuminated, the light scattered from the edge can not reach lens 18. A small fraction of the light scattered by 168 falls on edge 169 which protrudes beyond the line of vision between 168 and 170 but not far enough to see either lens 16 or 18, and is further scattered there. A small fraction of the light scattered from 169 falls on 170, is further scattered there, so that only a very small fraction of the light scattered on edge 168 will reach lens 18. This precaution is important, since part of the light reaching lens 18 is scattered on its surface and part of that scattered light reaches the photomultiplier where it could cause a spurious signal. In this drawing three edges are shown, the first (168) obstructing the line of vision between lens 16 and the second (169), the second obstructing the line of vision between the first and the third, and the third obstructing the line of vision between the second and lens 18. If edge 169 would be missing or would not protrude between the line of vision between edges 168 and 169, the suppression of scattered light would not be as effective, but even two edges constitute a substantial advantage over a single edge.

During a normal operation of the instrument, the armature 151 and the light baffle 145, 146, 147 are in the position as shown so that the baffle clears the inspection zone and counting of dust particles can take place as though the calibrating system were non-existent. Periodically, say, every thirty seconds and for a duration of three seconds, coil 156 is energized and pulls in armature 152 which interposes the light baffle 145, 146, 147 into the inspection zone in such a way that hole 148 is illuminated by the lamp and hole 148' is inspected by the photomultiplier. The light entering hole 148 is dispersed on the inside walls formed by holes 148, 149 and 148' which constitute a diffusing chamber, and some of it will leave hole 148' in the direction of second objective 18. In this way, for these calibrating periods, light that would illuminate dust particles or light that would be reflected from dust particles toward the photomultiplier is intercepted, but the light transmitted by holes 148, 148' provides a steady calibrating signal. Simultaneously with this movement of the light baffle, pushrod 157 pushes contactor 124 to open its contact with contactor 126 which will allow contactor 126 to bend straight and make contact with contactor 127, and finally contactor 124 will make contact with contactor 125. This will increase the plate load of the photomultiplier, intercept signals toward the counting circuit and establish contact from photomultiplier plate load to capacitor 140 to activate the automatic gain control system, as described in connection with FIG. 8. During the rest of the time contactor 126 is away from 127, so that signal can reach the counting circuit, 124 makes contact with 126, so that the plate load resistance of the photomultiplier is as low as required for counting and 124 and 125 are apart so that capacitor 140 is insulated and retains such charge as was impressed on it during calibration. Spring 181 and proper adjustment of disc 158 insure that contact 124—125 is broken before holes 148, 148' leave the calibrating position, leaving capacitor 140 charged correspondingly to this calibration.

Whereas this embodiment of the invention was described in connection with the circuit diagram of FIG. 8, it should be understood that this was done for brevity only. Many other circuits could be used in connection with it as well. In particular, the duration of the calibrating pulse can be shortened to a small fraction of a second by reducing the time constant of the 129—140 combination through interposition of a cathode-follower. Short calibrating pulses can also be amplified in resistance-capacitance coupling and in such case it becomes unnecessary to increase the plate load of the photomultiplier. The activating pulses for solenoid 156 may be provided by a rotating disc and wiper arrangement, by an electronic oscillator, or by a circuit utilizing additional contactors driven by pushrod 157.

Whereas all described embodiments referred to optical detection and to determining the number of particles per unit volume (as described in Patent No. 2,775,159), it should be understood that the principle of the invention may be used equally to devices which individually count the particles or individually signal the presence of single particles, and to non-photoelectric devices as well. Where the description of the drawings gives numerical data for dimensions, circuit values, tube types, and so forth, it is only for ease of understanding their respective roles and it should be understood that these are given for the sake of illustration only, and it should not be construed that these specific data represent the optimum or only possible ones. Improvements over or deviations from the drawings as substituting transistor amplification for vacuum tube amplification, interchanging vacuum tube diodes and semi-conductor diodes, substitution of electronic gating for mechanical contactors, solid state devices for relays and so forth, may be possible, the automatic gain control system may influence the voltage applied to the lamp, may alter the sensitivity of a preamplifier following the photomultiplier, and many other changes from the examples described hereabove can be done.

Therefore, what I claim as new and desire to secure by Letters Patent is:

1. A device for keeping constant the sensitivity of a particle sensing device which senses particles by their influence on the transfer of signalling energy toward a transducing system which comprises means for transmitting a calibrating signal to the transducing system, automatic gain control means connected to said transducing system, a capacitor connected to an input of the automatic gain control means, and monitoring means admitting signals from the transducing system to said capacitor during the time of the calibrating signal and intercepting such signals at other times, the automatic gain control means being constructed and arranged to adjust the sensitivity of the particle sensing device as a function of the voltage on said capacitor.

2. A device for keeping constant the sensitivity of a light sensitive particle sensing system which senses particles by their influence on a beam of light projected to said particle sensing system which comprises means for projecting a calibrating light signal to said particle sensing system, automatic gain control means connected to said particle sensing system, a capacitor connected to an input of the automatic gain control means, and monitoring means admitting signals from the particle sensing system to said capacitor during the time of the calibrating signal and intercepting such signals at other times, the automatic gain control means being constructed and arranged to adjust the sensitivity of the particle sensing system as a function of the voltage on said capacitor.

3. A device for keeping constant the sensitivity of a particle sensing device which senses particles by a change in signalling energy in a path of signalling energy from a source of energy to a transducing system caused by particles in an inspection zone in said path of signalling energy which comprises automatic gain control means connected to an intentionally variable link of the chain of sensitivity of said path of signalling energy, a capacitor connected to an input of the automatic gain control means, means for transmitting a calibrating signal to the transducing system and a monitoring system admitting current to said capacitor during the presence of said calibrating signal and intercepting current during absence of said calibrating signal, the automatic gain control means being constructed and arranged to adjust the sensitivity of the said intentionally variable link as a function of the voltage on said capacitor.

4. A device for keeping constant the sensitivity of a particle sensing device which senses particles by their influence on the transfer of signalling energy toward a transducing system which comprises means for transmitting a calibrating signal to the transducing system, automatic gain control means suitable to adjust the sensitivity of the particle sensing device, a capacitor connected to an input of the automatic gain control means, and monitoring means admitting signals from the transducing system to said capacitor during the time of the calibrating signal and intercepting such signals at other times, the automatic gain control means being constructed and arranged to adjust the sensitivity of the particle sensing device as a function of the voltage on said capacitor.

5. In a device for sensing particles in a fluid comprising a source of signalling energy, a transducing system sensitive to the signalling energy of said source, structural elements defining a main path of signalling energy and an inspection zone so that the presence of particles in said inspection zone causes a change of the flow of signalling energy from said source to said transducing system along said main path of signalling energy, structural elements defining an auxiliary path of signalling energy between said source and said transducing system having at least one time variable component of sensitivity common with the said main path of signalling energy, calibrating means admitting the passage of signalling energy along said auxiliary path of signalling energy during their activation and preventing it during the rest of the time, a capacitor, automatic gain control means having their input terminals connected to said capacitor and having their output terminals connected to an intentionally variable component common to said main path of signalling energy and to said auxiliary path of signalling energy, and monitoring means admitting the flow of current across their output terminals during the activation of said calibrating means and preventing the flow of current across their output terminals during the rest of the time, said output terminals of said monitoring means being connected between said transducing system and said capacitor.

6. In a photoelectric particle sensing device comprising a lamp, a photomultiplier tube, at least one lens illuminating a certain cross section of a fluid to be tested for the presence of particles with the light of said lamp, at least one lens gathering light from a given portion of said illuminated cross section toward said photomultiplier tube, so that particles inside the zone illuminated by said lamp and inspected by said photomultiplier tube alter the transfer of light from said lamp toward said photomultiplier tube, at least one auxiliary lens directing light from said lamp toward said photomultiplier tube along a path spaced from the fluid, a capacitor, a source of dynode voltage providing a dynode voltage which increases as the negative voltage on its input terminals decreases, calibrating means admitting light through said auxiliary lens for part of the time and intercepting it for the rest of the time, monitoring means admitting current flow across their output terminals during the time that the calibrating means admit light through said auxiliary lens, and preventing it during essentially the rest of the time, said output terminals of said monitoring means being connected between the plate circuit of said photomultiplier tube and said capacitor, said capacitor being connected to said input terminals of said source of dynode voltage, whereby the dynode voltage increases for low outputs during the calibrating signal and decreases for high outputs during the calibrating signal.

7. In a photoelectric particle sensing device comprising a lamp, a photomultiplier tube, at least one lens illuminating a certain cross section of a fluid to be tested for the presence of particles with the light of said lamp, at least one lens gathering light from a given portion of said illuminated area toward said photomultiplier tube so that particles inside an inspection zone illuminated by said lamp and inspected by said photomultiplier tube alter the transfer of light from said lamp toward said photomultiplier tube, at least one light filter, one light diffracting element and one pair of electrical contactors, a source of dynode voltage providing a dynode voltage as a function of the voltage on its input terminals, a mechanical motor system, said light filter, said diffracting element and part of said pair of electrical contactors being mechanically connected to said mechanical motor system in such a way that for relatively short periods of time said light filter intercepts the flow of light from lamp to inspection zone and hence to photomultiplier tube, said light diffracting element is inside said inspection zone and said pair of electrical contactors is in a first of its two alternative positions, whilst during the rest of the time said light filter is clear of the path of said light, said light diffracting element is outside said inspection zone and said pair of contactors is in the second of its two alternative positions, said pair of contactors being connected in a monitoring circuit admitting current from said photomultiplier tube to said capacitor during said first alternative position of said pair of contactors and preventing said flow in said second alternative position of said pair of contactors and said capacitor being connected to said input terminals of said source of dynode voltage, whereby the dynode voltage increases for low outputs caused by said diffracting element and decreases for high outputs caused by said diffracting element.

8. In a photoelectric particle sensing device comprising a lamp, a photomultiplier tube, an inspection chamber suitable to hold a fluid to be inspected, optical means illuminating a portion of said chamber with the light of said lamp, optical means diverting the light from at least part of said illuminated area toward the cathode of said photomultiplier tube, so that the presence of particles in the volume illuminated by said lamp and inspected by said photomultiplier tube cause a change in the transfer of light from said lamp toward said photomultiplier tube, an automatic gain control circuit having a capacitor on its input terminals and having its output terminals connected to a voltage divider feeding the dynodes of said photomultiplier tube providing a dynode voltage which increases as the negative voltage on its input terminals decreases, a manually operable element in mechanical contact with light admitting means, light intercepting means and a set of electrical contactors, said manually operable element having a calibrating position and a particle sensing position, said light intercepting means intercepting substantially all such light as might be diffracted by particles in said inspection zone in said calibrating position and admitting it in said particle sensing position, said light admitting means admitting a beam of calibrating light in said calibrating position and intercepting it in said particle sensing position, and said electrical contactor interconnecting said capacitor with the plate circuit of said photomultiplier tube in said calibrating position and insulating said capacitor in said particle sensing position.

9. In a photoelectric particle sensing device according to claim 8 a low resistance plate load resistor and a high resistance plate load resistor for said photomultiplier tube and contactors on said set of electrical contactors which switch to high plate load resistance in said calibrating position and to low plate load resistance in said particle sensing position.

10. In a photoelectric particle sensing device according to claim 8 contactors on said set of electrical contactors suppressing signals from photomultiplier output to computer input in said calibrating position.

11. A calibrator for device of claim 2 comprising a baffle with an opening in it and means to keep said baffle alternatingly in a first position and a second position, said first position clearing said baffle from the path of signalling energy of said sensing device said second position interposing it into said path in such a way that it essentially obstructs said path of signalling energy but transmits a small amount of calibrating signal through said hole.

12. A baffle according to claim 11 having at least two edges on its side entering said path of signalling energy each of which intercepts the line of vision between one of the objectives and the other edge.

13. A baffle according to claim 11 with a hole having two small openings at its two ends and a diffusing chamber between these two small openings.

14. A device for keeping constant the sensitivity of a particle sensing device which senses particles by their influence on the transfer of signalling energy toward a transducing system intended for periodically making tests of limited time duration to be initiated by manual starting means comprising calibrating means, automatic gain control means connected to said transducing system, a capacitor connected to said automatic gain control means, a programming device having at least two sequential stages the first of said sequential stages actuating said calibrating means and admitting current from said transducing system to said capacitor, said second sequential stage allowing the instrument to perform its test and disconnecting said capacitor, said automatic gain control system being constructed and arranged to adjust the sensitivity of said instrument as a function of the voltage on said capacitor, said programming device being operatively connected to said manual starting means.

15. A device for keeping constant the sensitivity of a particle sensing device which senses particles by their influence on the transfer of signalling energy toward a transducing system which comprises means for transmitting calibrating signals at timed intervals to the transducing system, automatic gain control means connected to said transducing system, a capacitor connected to an input of the automatic gain control means, and monitoring means admitting signals from the transducing system to said capacitor during the time of the calibrating signals and intercepting such signals at other times, the intervals of time between calibrating signals being sufficiently short to keep unchanged the voltage on the capacitor, the automatic gain control means being constructed and arranged to adjust the sensitivity of the particle sensing device as a function of the voltage on said capacitor.

16. A device for keeping constant the sensitivity of a device which senses the transfer of signalling energy toward a transducing system which comprises means for transmitting calibrating signals at timed intervals to the transducing system, automatic gain control means connected to said transducing system, a capacitor connected to an input of the automatic gain control means, and monitoring means admitting signals from the transducing system to said capacitor during the time of the calibrating signals and intercepting such signals at other times, the interval of time between calibrating signals being sufficiently short to keep substantially unchanged the voltage on the capacitor, the automatic gain control means being constructed and arranged to adjust the sensitivity of the sensing device as a function of the voltage on said capacitor.

17. A device for keeping constant the sensitivity of a device which senses the transfer of signalling energy toward a transducing system which comprises means for transmitting a calibrating signal to the transducing system, automatic gain control means connected to said transducing system, a capacitor connected to an input of the automatic gain control means, and monitoring means admitting signals from the transducing system to said capacitor during the time of the calibrating signal and intercepting such signals at other times, the automatic gain control means being constructed and arranged to adjust the sensitivity of the sensing device as a function of the voltage on said capacitor.

References Cited in the file of this patent

UNITED STATES PATENTS

| | | |
|---|---|---|
| 2,000,948 | Hayes | May 14, 1935 |
| 2,076,553 | Drinker et al. | Apr. 13, 1937 |
| 2,349,656 | Gulliksen | May 23, 1944 |
| 2,775,159 | Frommer | Dec. 25, 1956 |
| 2,850,239 | Polanyi et al. | Sept. 2, 1958 |
| 2,971,695 | Sick | Feb. 14, 1961 |